Patented Mar. 15, 1938

2,111,042

UNITED STATES PATENT OFFICE 2,111,042

MARGARINE

Frank J. Cahn and Benjamin R. Harris, Chicago, Ill.

No Drawing. Application April 15, 1937,
Serial No. 137,010

12 Claims. (Cl. 99—123)

Our invention relates to improvements in margarine.

It has already been proposed to prevent or reduce the spattering of margarine during frying by the incorporation of various chemical compounds into the margarine. These chemical compounds appear to have the property of so orientating themselves at the water-oil interface of the margarine as to bring about a marked reduction and, in many cases, practically complete elimation of the spattering of margarine when utilized for frying purposes. The patent to Benjamin R. Harris, No. 1,917,256 treats of this subject at great length and teaches the employment of various classes of chemical compounds which are effective anti-spattering agents.

In general, our invention consists in the preparation of non-spattering margarines by the incorporation into margarine of a certain class of chemical compounds not heretofore even suspected of possessing the property of reducing or preventing the spattering of margarine. This class of compounds, which is described in considerable detail hereinafter, is characterized by the presence of a hydrophilic group in a particular location in the molecule of the antispattering agent.

The principal object of our invention is accordingly to improve margarine, particularly with reference to its spattering characteristics.

Another object of our invention is the production of a relatively non-spattering margarine.

Still another object of our invention is the provision of a class of substances having the property of decreasing or substantially preventing the spattering of margarine in frying operations.

We have found that certain derivatives of higher molecular weight carboxylic acids possess the unexpected property of preventing or decreasing the spattering of margarine. In general, our invention resides in the discovery that higher molecular weight carboxylic acids or derivatives thereof which possess no or very slight anti-spattering properties, when used in margarine, acquire such properties when at least one of the hydrogen atoms attached to the carbon atom adjacent to the carboxyl group of said higher molecular weight carboxylic acid or derivative is replaced by a hydrophile group. Among the hydrophile groups which may be utilized and which have been found useful are the following: hydroxy, sulphate, sulphonic, phosphate, pyrophosphate, tetraphosphate, sulpho-carboxylic acid such as sulpho-acetate, sulpho-propionate, etc., quaternary ammonium and other hydrophilic nitrogenous or non-nitrogenous groups. Peculiarly enough, the anti-spattering properties do not manifest themselves, at least to any noticeable extent, unless at least one hydrophile group is in the alpha position to the carboxyl group or, in other words, unless a hydrophile group is attached to the carbon atom adjacent to the carboxyl group of the higher molecular weight carboxylic acid or derivative thereof.

It will be understood that we employ the term "hydrophile group" to include the radical specifically recited above and, in accordance with present chemical nomenclature, to include such other groups which possess an affinity for water or aqueous media. The degree or extent of the hydrophilic properties is dependent upon the number and character of the hydrophile groups and the character of the other group or groups with which it is associated in the molecule. It is likewise apparent that the various hydrophile groups will vary in hydrophilic potency. Thus, for example, a sulphate, a phosphate or a sulphoacetate group is more potent in this regard than a hydroxy group. As a general proposition, therefore, the hydrophilic potency of a compound containing a hydroxy group or groups may be enhanced by substituting for the hydrogen of said hydroxy group or groups a sulphate, phosphate, sulpho-acetate or similar group.

Among the higher molecular weight carboxylic acids which may be employed to produce compounds suitable for the purposes of our invention are the following: higher fatty acids, saturated and unsaturated, such as caproic, capric, caprylic, lauric, myristic, palmitic, oleic, stearic, linoleic, ricinoleic, melissic, 1-hydroxystearic; mixed higher fatty acids, saturated and unsaturated, derived from animal or vegetable sources, for example, lard, coconut oil, corn oil, cottonseed oil, sardine oil, partially or completely hydrogenated animal and vegetable oils such as cottonseed oil, corn oil, seasame oil, lard and soya bean oil; higher carboxylic acids derived from various waxes such as beeswax, spermaceti, and carnauba wax; higher molecular weight carboxylic acids derived by oxidation and other methods from petroleum; hydroaromatic carboxylic acids such as dihydro methyl cyclohexylidene acetic acid, and cycloaliphatic acids such as various naphthenic acids.

Many of the compounds which we herein employ in margarine have never been prepared heretofore. Others, though not novel as chemical compounds, have not, to our knowledge, been utilized to prevent or decrease the spattering of margarine, undoubtedly because the nature of the molecules of such compounds was such as to lead away from even a conjecture of such utility therefor.

In order that those skilled in the art may have a full picture of the nature and scope of our invention, we list hereinbelow various compounds which may be employed successfully, in accordance with our invention, to decrease the spattering of margarine during frying operations or the like:

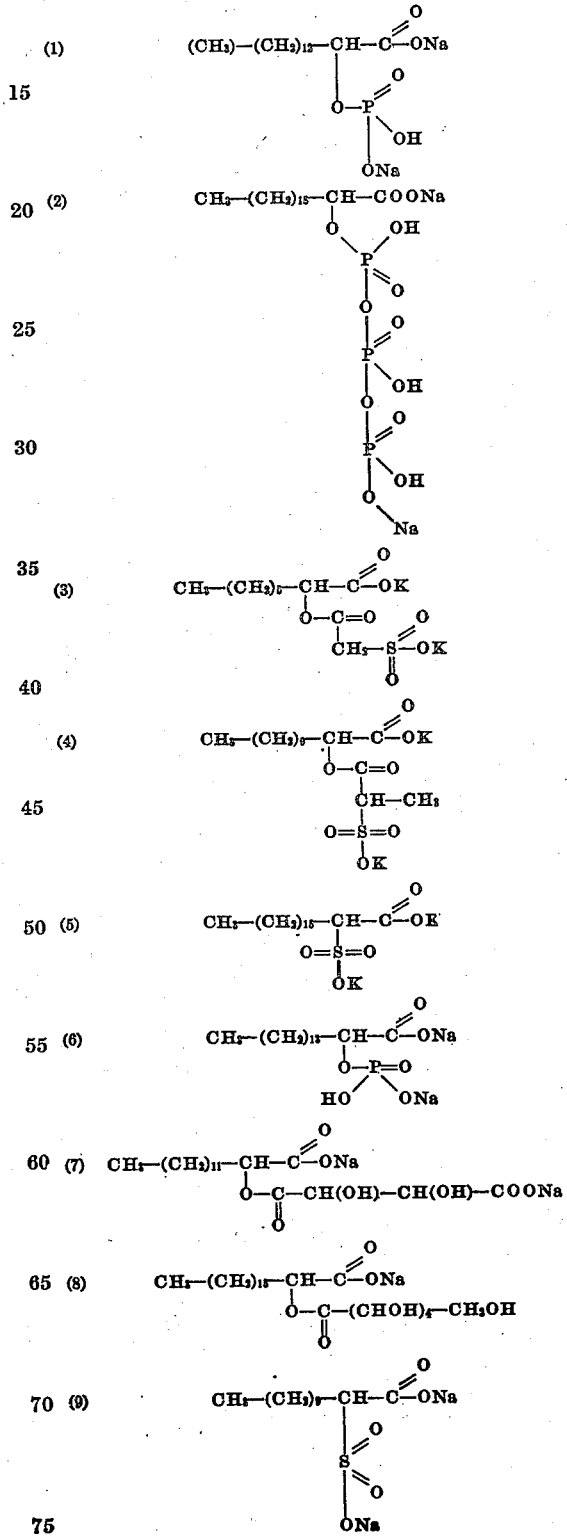

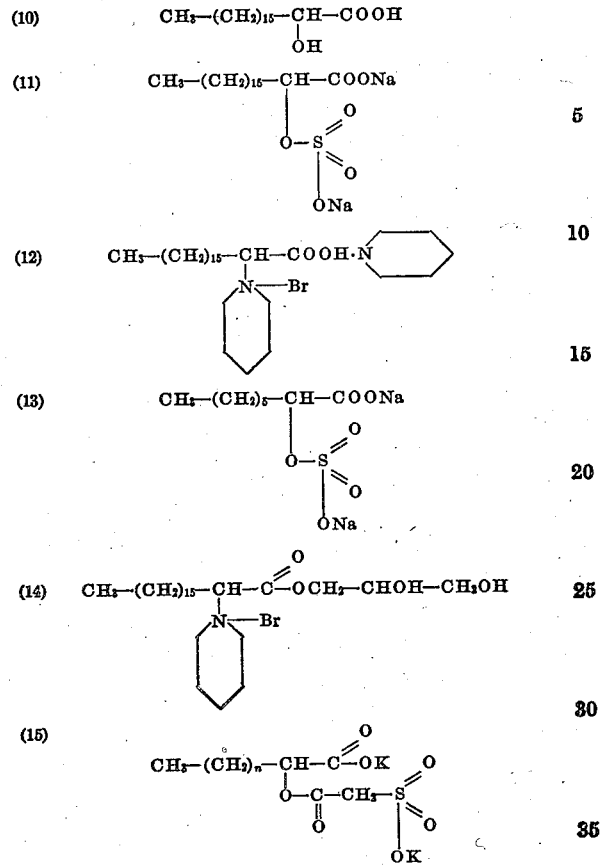

($n$ is primarily 9 and 11—derived from coconut oil fatty acids)

While the above compounds represent single substances, in practice it is generally more convenient to make and use compositions of which said compounds form only a part as, for example, reaction mixtures containing said compounds. In addition, mixtures of any two or more of said anti-spattering agents may be employed with excellent results if desired.

As is apparent from the various examples of anti-spattering agents listed above, many of said compounds are higher molecular weight carboxylic acids, particularly higher fatty acids, and derivatives thereof wherein at least one hydrogen attached to the carbon adjacent to the carboxyl group is replaced by a radical containing oxygenated sulphur or oxygenated phosphorus. The compounds in said list numbered (1), (2), (3), (4), (5), (6), (9), (11), (13) and (15) fall into this category. The other compounds in said list, while not falling into the above category, nevertheless are characterized by the presence, in the alpha position to the carboxyl group of the higher molecular weight carboxylic acid or derivative thereof, of a hydrophile group in place of hydrogen.

In general, and as is evident by a consideration of the examples listed above, the carboxyl group of the fatty acid, which fatty acid has attached in the alpha position a hydrophile group as described, may be neutralized with organic or inorganic substances, may be esterified or converted to an amide, or may be simply allowed to remain as such.

The following examples are illustrative of methods of producing various of the anti-spattering agents of our invention:

Example A 455 grams of stearic acid were heated together with 280 grams of anhydrous bromine in the presence of 3 cc. of phosphorus trichloride at temperatures of from 60 degrees C. to 100 degrees C. over a period of 16 hours. Moisture was excluded and a reflux condenser employed. The excess bromine was removed by distillation at 100 degrees C. and at a reduced pressure. The resulting product was neutralized with 1 normal sodium hydroxide and heated on a boiling water bath for 8 hours, normal sodium hydroxide solution being added to keep the solution slightly alkaline. The resulting alpha hydroxystearic acid soap was acidified with dilute sulphuric acid until a pH of from 2 to 3 was reached and the free alpha hydroxy-stearic acid was then salted out by adding sodium sulphate. The salted out product was re-dissolved in hot water and re-precipitated by sodium sulphate. The alpha hydroxystearic acid, after drying on the water bath, was 80% pure and free of olefines. It is a white, solid, wax-like material, slightly soluble in hot water.

Example B 100 grams of alpha hydroxystearic acid were dissolved in 200 cc. of ethylene dichloride and chilled to −20 degrees C. 40 grams of chlor-sulphonic acid were added to the solution, while stirring, whereby the temperature was allowed to rise gradually to 10 degrees C. In the presence of ice, a chilled 10% sodium hydroxide solution was added until neutral reaction was obtained, the temperature being kept below 5 degrees C. The solution thus obtained was evaporated on the water bath and the residue extracted with hot isopropyl alcohol containing 10% of water. The isopropyl alcohol extract on evaporation yielded the alpha sulphate ester sodium salt of sodium stearate, a white powder, freely soluble in water.

Example C 9.7 grams of anhydrous glycerol were heated with 36.1 grams of alpha bromstearic acid for 3 hours at 130 degrees C. and then for 6 hours at 160 degrees C. 11.4 grams of the reaction mixture were dissolved in 10 grams of pyridine and the solution allowed to stand for one week at room temperature. The excess pyridine and glycerol were dissolved out with petroleum ether. The substance obtained, the glycerol ester of alpha brom pyridinium stearic acid, is a brown paste, soluble in water.

Example D 100 grams of alpha hydroxy coconut oil fatty acids were heated with 100 grams of mono chloracetic acid at 160 degrees C. for 4 hours while passing a slow stream of carbon dioxide through the mixture. After the reaction was over, the product was washed repeatedly with hot water to free it from excess chloracetic acid. 44 grams of the resulting chloracetate, containing 68.5% of the theoretical chlorine content, were stirred with a saturated aqueous solution containing 72 grams of potassium sulphite for 8 hours, the temperature being gradually raised from 50 degrees C. to 70 degrees C. and the evaporated water being gradually replenished. All of the chlorine present thereby was transformed into the ionized form. 8 volumes of hot isopropyl alcohol were then poured over said product. The hot isopropyl alcohol was then decanted and the remainder filtered from the inorganic salts. Upon evaporation of the isopropyl alcohol, the product obtained contained 71% of the theoretical sulphur content. The substance, sulphoacetic acid esters of alpha hydroxy coconut oil fatty acids, potassium salt, is a yellow wax-like material, freely soluble in hot water.

Example E 33 grams of alpha brom caprylic acid were reacted with 135 cc. of concentrated ammonia under conditions similar to those given in "Organic Syntheses"—vol. IV, page 3, (New York—Wiley & Sons—1925). The resulting product, alpha amino caprylic acid, is white, crystalline and tasteless.

In those cases where the hydrophilic group, in the alpha position to the carboxyl group of the anti-spattering agent, contains an acidic or replaceable hydrogen, the latter may be replaced by any suitable cation of organic or inorganic character. These include the alkali metals, ammonium, calcium, magnesium, aluminum, zinc, and the like. Furthermore, aliphatic and aromatic amines including alkylolamines such as mono-ethanolamine, diethanolamine, triethanolamine and mixtures thereof, pyridine, quaternary ammonium bases, and other anti-acid materials may be used to neutralize acid groups such as carboxyl, sulphuric and phosphoric groups.

The anti-spattering agents of our present invention may be incorporated into the margarine emulsion either in the churn or in the blender, as described in Patents Nos. 1,917,249; 1,917,250; 1,917,251; 1,917,252; 1,917,253; 1,917,254; 1,917,255; 1,917,256; 1,917,257; 1,917,258; 1,917,259; 1,917,260; and 1,917,273. We prefer, however, to incorporate the antispattering agents, in the form of an aqueous paste, into the plastic margarine emulsion on the blender, as described more particularly in Patents Nos. 1,917,250 and 1,917,256. The above anti-spatterers may be used in margarine, not only by themselves but in connection with other agents, known as anti-weeping agents, which have the property to reduce the leaking of margarine when used in small proportions; thus, for example, they may be used in combination with high molecular weight fatty acid esters of glycerin, which contain one or two unesterified glycerin hydroxy groups, such as a mixture of mono- and/or di-glycerides of stearic acid, palmitic acid, oleic acid or the mono- and/or di-glycerides of partially or completely hydrogenated fatty acids derived from the fats or oils of the animal or vegetable kingdom. The use of such combinations enhances the dispersion of the anti-weeping agents so that smaller proportions may be used more effectively. In this general connection, reference may be had to Patent No. 1,917,253 where the conjoint use of anti-spattering and anti-weeping agents is described in detail.

The proportions of the anti-spattering agent utilized in the margarine are not critical and will naturally vary, being dependent upon the potency of the particular anti-spattering agent selected and upon the nature of the results desired. In general, we have obtained excellent results with percentages of ⅛% and even less as well as with percentages upwards of 1%, indeed, several times such latter amount, based upon the weight of the margarine. The upper percentage limit, of course, is dependent upon economic considerations and upon the additional practical consideration that the amount employed must not be so large as to affect unfavorably the texture of the margarine. As a general proposition, percentages of ¼% to ¾% are eminently satisfactory.

In the patent to Benamin R. Harris, No. 1,917,250, referred to hereinabove, a table of comparative anti-spattering powers of various substances is disclosed on pages 9 and 10 thereof. Based on the tests and criteria established by said patent, we may indicate generally the comparative anti-spattering powers of various of the compounds of our present invention. Compound No. (3) of the list of compounds set forth hereinabove, in proportion of approximately ⅛% possesses an anti-spattering power of 95%; compound No. (10) in proportion of 1% has an anti-spattering power of 60%; compound No. (11) in proportion of ¼% has an anti-spattering power of 90%; compound No. (12) in proportion of ⅛% has an anti-spattering power of 95% and in proportion of ¼% anti-spattering power of 100%; compound No. (13) in proportion of ½% has an anti-spattering power of 75%; compound No. (14) in proportion of ¼% has an anti-spattering power of 70% and in proportion of ½% anti-spattering power of 100%; and compound No. (15) in proportion of ¼% has an anti-spattering power of 95%.

While, for use in margarine, only innocuous substances are recommended, other substances mentioned are for purposes of illustration only in order to teach those skilled in the art the broad, underlying principle of our invention.

Wherever the term "higher" is used in the specification and claims to refer to the chemical compounds of our invention as, for example, higher fatty acids, the term "higher" will be understood to cover at least six carbon atoms.

What we claim as new and desire to protect by Letters Patent of the United States is:

1. A relatively non-spattering margarine comprising a plastic emulsion of oleaginous material and aqueous material and containing a small proportion of a substance selected from the group consisting of uninterrupted carbon chain higher carboxylic acids and derivatives thereof wherein at least one of the hydrogen atoms attached to the alpha-carbon atom of said carboxylic acid or the carboxylic acid radical of said derivative thereof is replaced by a hydrophilic group.

2. The product of claim 1, wherein the hydrophilic group is a radical selected from the class consisting of hydroxy, sulphate, sulphonic, sulpho carboxylic, phosphate, pyrophosphate, tetraphosphate, and quaternary ammonium.

3. A relatively non-spattering margarine, comprising a plastic emulsion of oleaginous material and aqueous material and containing a small proportion of a substance selected from the group consisting of higher fatty acids and derivatives thereof wherein at least one of the hydrogen atoms attached to the alpha-carbon atom of said fatty acid or the fatty acid radical of said derivative thereof is replaced by a hydrophilic group.

4. The product of claim 3, wherein the hydrophilic group is a radical selected from the class consisting of hydroxy, sulphate, sulphonic, sulpho carboxylic, phosphate, pyrophosphate, tetraphosphate, and quaternary ammonium.

5. The product of claim 3, wherein the fatty acid or derivative thereof is derived from natural oils, fats and waxes and contains between twelve and eighteen carbon atoms.

6. A relatively non-spattering margarine comprising a plastic emulsion of oleaginous material and aqueous material and containing a small proportion of a substance selected from the group consisting of higher fatty acids and derivatives thereof containing between twelve and eighteen carbon atoms and derived from natural oils, fats and waxes, at least one of the hydrogen atoms attached to the alpha-carbon atom of said fatty acid or the fatty acid radical of said derivative thereof being replaced by a hydrophilic group selected from the class consisting of hydroxy, sulphate, sulphonic, solphocarboxylic, phosphate, pyrophosphate, tetraphosphate, and quaternary ammonium.

7. A relatively non-spattering margarine comprising a plastic emulsion of oleaginous material and aqueous material and containing a small proportion of an interrupted carbon chain higher molecular weight carboxylic acid wherein at least one hydrogen attached to the alpha carbon atom of said carboxylic acid is replaced by an hydroxy group.

8. A relatively non-spattering margarine comprising a plastic emulsion of oleaginous and aqueous material and containing a small proportion of an alpha hydroxy higher fatty acid.

9. The product of claim 8, wherein the alpha hydroxy higher fatty acid is alpha hydroxy stearic acid.

10. A relatively non-spattering margarine comprising a plastic emulsion of oleaginous material and aqueous material and containing a small proportion of an alpha hydroxy higher carboxylic acid wherein the hydrogen of the alpha hydroxy group is replaced by a member selected from the group consisting of oxygenated sulphur and oxygenated phosphorus radicals.

11. A relatively non-spattering margarine comprising a plastic emulsion of oleaginous material and aqueous material and containing a small proportion of an alpha hydroxy higher fatty acid containing between twelve and eighteen carbon atoms, wherein the hydrogen of the alpha hydroxy group is replaced by a member selected from the group consisting of oxygenated sulphur and oxygenated phosphorus radicals.

12. A relatively non-spattering margarine comprising a plastic emulsion of oleaginous material and aqueous material and containing a small proportion of a derivative of a higher mono-carboxylic acid containing at least one hydrophilic radical attached to the alpha-carbon atom of the higher carboxylic acid, said derivative being selected from the group consisting of the neutralization, amidization and esterification reaction products of said higher carboxylic acid derivative.

FRANK J. CAHN.
BENJAMIN R. HARRIS.